INVENTOR:
JAMES C. HAMRICK

ATTORNEYS

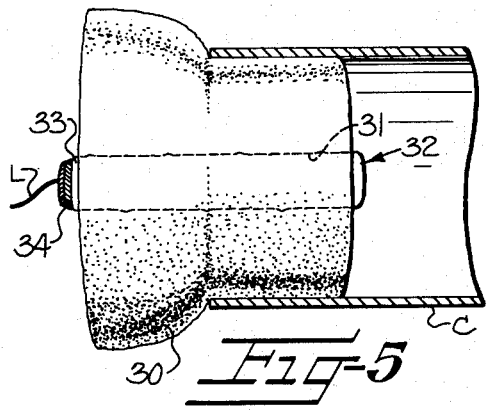
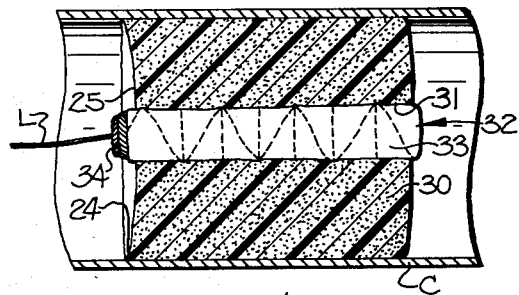
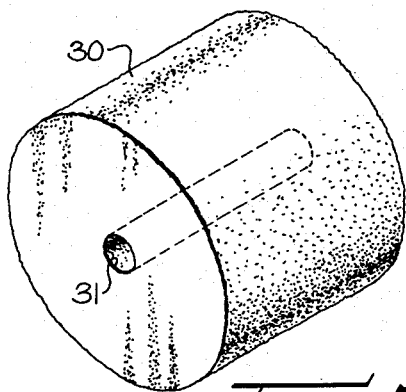
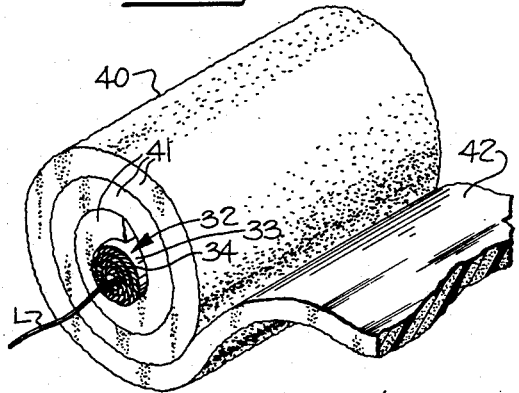
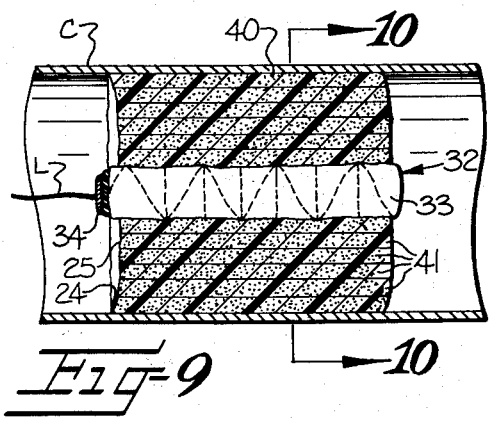
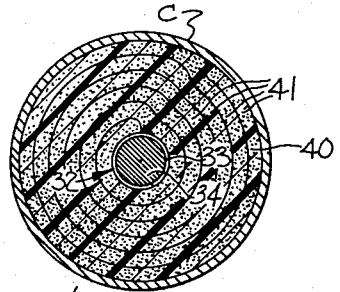
INVENTOR:
JAMES C. HAMRICK

United States Patent Office 3,179,375
Patented Apr. 20, 1965

3,179,375
APPARATUS FOR LAYING LINES IN CONDUITS
James C. Hamrick, Charlotte, N.C., assignor to Jet Line Products, Inc., Charlotte, N.C., a corporation of North Carolina
Filed Mar. 12, 1962, Ser. No. 178,802
3 Claims. (Cl. 254—134.4)

This invention relates to a method and apparatus for laying a guide line in a conduit to facilitate the installation of a relatively rigid line or similar elongated article—such as an electrical cable or conductor, a lengthy thermo-sensitive element, etc.—within the length of the conduit by attaching the relatively rigid line to one end of the guide line extending through the conduit and thereafter pulling on the other end of the guide line to draw the relatively rigid line within the conduit.

In my earlier U.S. Patent 3,006,067 issued October 31, 1961, there were disclosed a method and apparatus for the purpose described, wherein the apparatus included a flexible elongated roll of line having a cross-sectional area of a size substantially filling the internal diameter of the conduit through which a pliable guide line is to be introduced, fluid pressure being directed against the roll of line from one end of the conduit to propel the roll through the conduit, while paying out line therefrom in the length of the conduit as the roll travels through the conduit. Situation may arise in which the outer diameter of an elongated roll of line is relatively small as compared to the internal diameter of the conduit through which the guide line is to be introduced. Under such circumstances, the use of fluid pressure directed against a comparatively small-sized line package as contrasted to the internal diameter of the conduit may be uneconomical because of the high percentage of wasted fluid pressure passing beyond the small-sized line package in the space between the line paskage and the internal wall of the conduit which does not contribute to the forward movement of the line package in the conduit. In extreme instances, the disparity in diameters as between the elongated line package and the conduit through which it is to be passed may be so great as to cause the line package to depart from its head-long flight through the conduit and to assume a position where its longitudinal axis is transversely disposed with respect to the longitudinal axis of the conduit, or the line package may even reverse itself within the conduit. Such occurrences would seriously impair the efficiency of the line package in paying out line within the length of the conduit or may even stop this function altogether.

Other efforts to introduce a guide line through the length of a conduit for subsequently installing electrical conductors or the like within the conduit in the manner described have included the use of a rubber ball element as a medium for introducing the guide line through the length of the conduit. An end of the guide line is attached to the rubber ball element, and the rubber ball element is forced through the conduit by compressed air directed against the rubber ball element from one end of the conduit. The rubber ball element offers a limited area of sealing engagement with the internal wall surface of the conduit through which it is to be passed, the sealing engagement being intended to prevent leakage of fluid pressure past the rubber ball element. The rubber ball element, while appearing to afford a fluid-tight seal with the internal wall of the conduit entailing minimum friction as the ball moves forwardly in the conduit because of the small area of sealing engagement involved, has offsetting disadvantages because of the nature of rubber material and the spherical shape of the ball element. Since rubber is not compressible to any appreciable degree, the rubber ball element must be accurately dimensioned with respect to the particular internal diameter of the conduit through which it is to be passed in order to afford an adequate seal therebetween, thereby necessitating the use of rubber ball elements of varying diameters to fit the divers internal diameters of conduits in which electrical conductors or the like are to be installed. The limited area of sealing engagement between the internal wall surface of the conduit and the rubber ball element which would tend to minimize frictional resistance against the force of fluid pressure pushing the rubber ball element forwardly in the conduit is more than offset by the friction characteristics of rubber, the rubber material magnifying the frictional resistance encountered by the ball element as it is pushed forwardly in the conduit under the influence of fluid pressure. The spherical shape of the rubber ball element tends to direct fluid pressure impinging thereagainst toward its outermost extremities where sealing engagement between the rubber ball element and the internal wall surface of the conduit occurs. The flow of fluid pressure toward the outermost extremities of the rubber ball element is conducive to forcing the limited sealing area of the rubber ball element inwardly and away from the internal wall surface of the conduit to break the sealing engagement therebetween, resulting in the leakage of fluid pressure past to rubber ball element.

Accordingly, it is a primary object of the present invention to provide an improved method and apparatus for laying a guide line in the length of a conduit, the apparatus being of the type comprising a line carrier in sealing relationship with the internal wall surface of the conduit to economize on the amount of fluid pressure employed to push the line carrier through the conduit by preventing leakage of fluid pressure past the line carrier. The line carrier of the improved apparatus is made of highly compressible, flexible, resilient material and is elongated to afford a substantial area of sealing engagement with the internal wall of the conduit without materially affecting the frictional resistance encountered by the line carrier as it is urged forwardly within the conduit by fluid pressure impinging thereagainst. In one embodiment of the apparatus, the line carrier takes the form of an elongated plug having an end of a guide line extending from a line supply attached thereto, the line supply being located outside of a conduit through which the line carrier is to be thrust by fluid pressure. The method corresponding to this embodiment is practiced by directing fluid pressure against the trailing end of the line carrier, following the insertion of the line carrier within the conduit which compresses the line carrier to produce a fluid-tight seal between the line carrier and the internal wall surface of the conduit. The line carrier is thrust forwardly through the conduit under the influence of the fluid pressure to lay the guide line in the length of the conduit by pulling the guide line from the line supply located outside of the conduit. Other embodiments of the apparatus include line carriers transporting their own supply of line as they move through a conduit, one such line carrier taking the form of an elongated plug having a centrally disposed bore receiving a line package and another line carrier comprising strip material wound in a coil about a line package. The method corresponding to these latter embodiments includes the paying out of the guide line in the length of the conduit from the line package transported by the line carrier as the line carrier moves through the conduit under the influence of fluid pressure. In each embodiment according to this invention, compression of the line carrier by its insertion into a conduit through which it is to be passed produces limited deformation of the trailing end of the line carrier in a manner tending to enhance the effectiveness of the fluid-tight seal between the line carrier and the internal wall surface of the conduit, while directing the fluid pressure toward the central portion of the trailing end of the line carrier to more efficiently utilize the force thereof in thrusting the line carrier through the conduit.

Further and more specific objects and advantages of the invention will become apparent as the description proceeds, when taken in connection with the accompanying drawings, in which—

FIGURE 5 is a fragmentary longitudinal sectional view of one end of a conduit, similar to FIGURE 3, but showing a second form of line carrier in elevation as it is being inserted thereinto;

FIGURE 6 is a fragmentary longitudinal sectional view showing the line carrier of FIGURE 5 as it proceeds through the conduit;

FIGURE 7 is an isometric view of the line carrier shown in FIGURES 5 and 6 with the line package removed therefrom;

FIGURE 8 is an isometric view of a third form of line carrier as it is being assembled about a line package;

FIGURE 9 is a fragmentary longitudinal sectional view similar to FIGURE 6, but showing the line carrier of FIGURE 8 as it proceeds through the conduit; and FIGURE 10 is a transverse sectional view taken along the line 10—10 in FIGURE 9.

Figure 1:
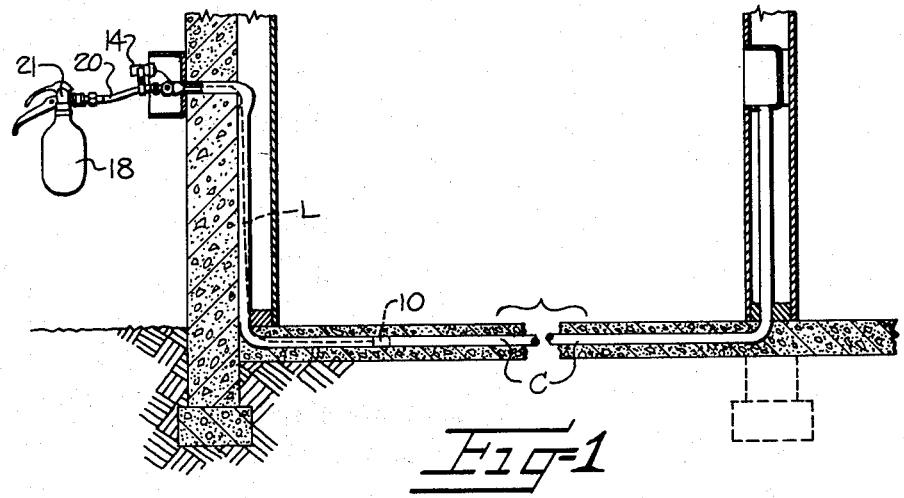
FIGURE 1 is a schematic view showing a conduit extending through a building, wherein a line carrier is being passed through the conduit to lay a guide line in the length of the conduit in accordance with the present invention.

Referring more specifically to the drawings, FIGURE 1 schematically illustrates the present method and apparatus for laying a guide line in the length of a conduit C which extends throughout a building and includes angular bends at various locations along its length, the conduit C being suitable for receiving electrical conductors or similar relatively rigid elongated articles therein.

Figure 2:
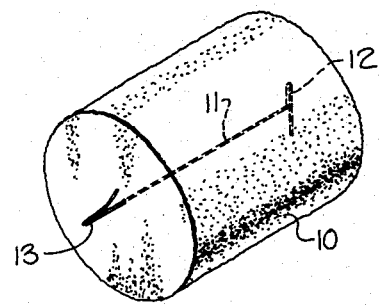
FIGURE 2 is an isometric view of one form of a line carrier utilized in accordance with the present invention.
Figure 3:
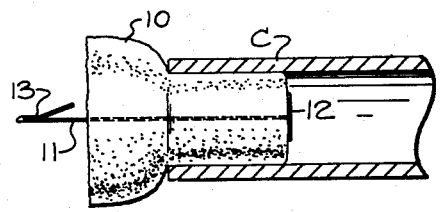
FIGURE 3 is a fragmentary longitudinal sectional view of one end of a conduit showing the line carrier of FIGURE 2 in elevation as it is being inserted in the end of the conduit.
Figure 4:
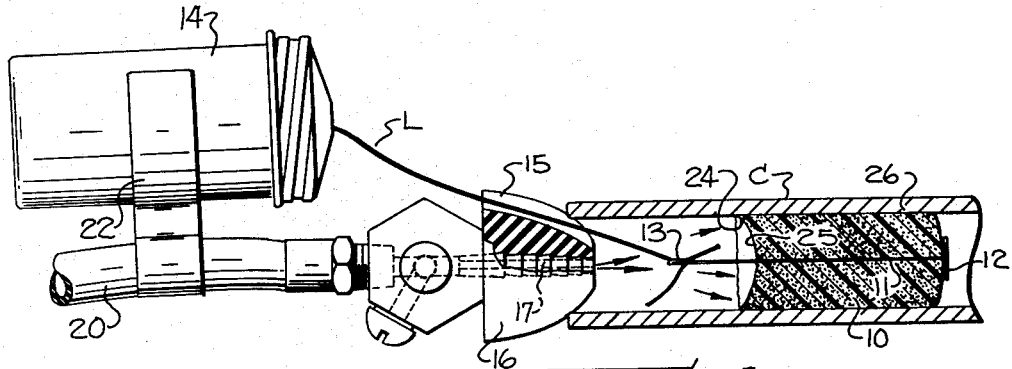
FIGURE 4 is a fragmentary side elevational view of a portion of one form of the apparatus, partially shown in longitudinal section for purposes of clarity, when placed in position at one end of the conduit for directing fluid pressure against the line carrier of FIGURES 2 and 3, the line carrier and the conduit being shown in longitudinal section as the line carrier proceeds through the conduit.

In practicing the improved method in accordance with the present invention, one form of the apparatus so employed is illustrated in FIGURES 2–4, inclusive, as comprising an elongated cylindrical plug or line carrier 10 adapted to be forced through the length of the conduit C by the application of fluid pressure against the trailing end thereof. The cylindrical line carrier 10 is flexible and resilient throughout its length and possesses a high degree of compressibility, being preferably made of elastomeric synthetic foam material, such as polyurethane foam. The line carried 10 is provided with means for securing an end of a pliable line thereto, such means comprising an elongate pin 11 embedded within the line carrier 10 and disposed substantially along the longitudinal axis thereof. The forward end of the pin 11 includes a reverse-bend lateral extension forming an enlarged head portion 12 integral therewith for abutment against the leading end of the line carrier 10, while the rear end portion of the pin 11 protrudes beyond the trailing end of the line carrier 10 and terminates in a hook 13 to which one end of a guide line L (FIGURE 4) is attached.

It will be observed in FIGURE 4 that a supply of the guide line L is contained in a line can 14 disposed outwardly of the conduit C, the guide line L extending from the line can 14 through a slit 15 formed in a tapered sealing adaptor 16 and within the conduit C to the hook 13 of the line carrier 10 where it is tied. The tapered sealing adaptor 16 is placed against the open end of the conduit C to provide a closure therefor preventing the escape of fluid pressure from this end of the conduit C. The sealing adaptor 16 is provided with a centrally disposed bore 17 through which fluid pressure is directed into the conduit C, the bore 17 communicating with a suitable source of fluid pressure outside of the conduit C, such as a portable container 18 (FIGURE 1) of compressed gas, by means of flexible tubing 20. A manually operable valve 21 is disposed in the dispensing outlet of the portable container 18 to control the flow of fluid pressure into one end of the conduit C through the flexible tubing 20 and the sealing adaptor 16. The line can 14 containing a supply of the guide line L may be suitably mounted on the flexible tubing 20 by a clip-on bracket 22.

In utilizing the apparatus to lay a guide line in the length of a conduit, it will be understood that the line carrier 10 has a diameter exceeding that of the conduit C with which it is used so as to cause the line carrier 10 to be compressed as it is inserted into an open end of the the conduit C. Upon inserting the line carrier 10 within the conduit C, the resulting compression of the elastomeric synthetic foam material of the line carrier 10 produces a peripheral, annular, rearwardly flaring tail 24 on the trailing end of the line carrier 10, and a concave depression 25 is formed in the trailing end of the line carrier 10. The rearwardly flaring tail 24 and the concave depression 25 formed on the line carrier 10 in response to its compression are shown in exaggerated form in FIGURE 4 to provide a clear illustration of these features. The guide line L attached to the rearwardly protruding hook 13 on the pin 11 embedded in the line carrier 10 is threaded through the slit 15 in the sealing adaptor 16, and the sealing adaptor 16 is placed in position closing the end of the conduit C. The outer peripheral surface of the line carrier 10 defines an elongated cylindriform sealing area 26 in sealing engagement with the internal wall surface of the conduit C. The nature of the highly compressible, elastomeric synthetic foam material of the line carrier 10 is such that the substantial area of sealing engagement afforded by the cylindriform sealing area 26 of the line carrier 10 with the internal wall surface of the conduit C does not materially increase the frictional resistance encountered by the line carrier 10 as it proceeds through the conduit C, while providing a fluid-tight seal of enhanced effectiveness to prevent fluid pressure from leaking forwardly of the line carrier 10 between the line carrier 10 and the internal wall surface of the conduit C. Upon opening the valve 21 on the container 18 of compressed gas, fluid pressure is directed against the rear end of the line carrier 10 to thrust the line carrier 10 forwardly in the conduit C, the fluid pressure being guided within the concave depression 25 formed in the rear end of the line carrier 10 and also being directed against the peripheral, annular, rearwardly flaring tail 24 on the line carrier 10 in a manner tending to urge the tail 24 in a radially outward direction to further increase the effectiveness of the fluid-tight seal between the line carrier 10 and the internal wall surface of the conduit C. In the latter respect, the tail 24 on the line carrier 10 acts as a pressure-responsive sealing lip under the influence of the fluid pressure issuing from the container 18 into the conduit C. As the line carrier 10 is thrust forwardly through the conduit C by the fluid pressure directed thereagainst, the line L is pulled therebehind from the supply of line contained in the line can 14 disposed outwardly of the conduit C at the end thereof through which the line carrier 10 was initially introduced. The high flexibility exhibited by the line carrier 10 throughout its longitudinal extent enables the line carrier 10 to successfully negotiate sharp angular bends which may be formed in the conduit C, the line carrier 10 flexing to conform with an angular bend in the conduit C as it passes therealong. In this way, the line carrier 10 is thrust through the length of the conduit C by the force of fluid pressure dispensed from the portable container 18 and directed thereagainst to lay the guide line L in the length of the conduit C without needlessly wasting fluid pressure.

By way of example, it has been determined that a cylindrical plug of highly compressible, elastomeric polyurethane foam having a diameter of 1¼ inches can be efficiently employed as a line carrier to lay a guide line through conduits having internal diameters ranging from ½ inch to one inch; a cylindrical plug having a diameter of 2¼ inches can be employed with conduits having internal diameters ranging from 1¼ inches to 2 inches; and a cylindrical plug having a diameter of 4¼ inches can be employed with conduits having internal diameters ranging from 2½ inches to 4 inches—the effectiveness of the fluid-tight seal between the line carrier and the conduit in the sizes and ranges given as examples being unimpaired and the line carrier functioning in an efficient manner to lay a guide line in the length of the conduit. In general, it may be stated that the compressibility of the material from which the line carrier is made should be sufficiently high to permit a line carrier having a given diameter to be used with conduits over a wide range of internal diameters. More particularly, elastomeric material offering no unusual friction problems and which is capable of being compressed to ½ of its original size or less can be fabricated as a line carrier which will provide a fluid-tight seal with the internal wall surface of conduits having a wide range of internal diameters.

A modified form of line carrier is illustrated in FIGURES 5-7, inclusive. The line carrier of FIGURES 5-7, inclusive, is designated by reference numeral 30 and comprises an elongated cylindrical plug provided with a cylindrical bore 31 coinciding with the longitudinal axis thereof. The cylindrical bore 31 receives an elongated substantially cylindrical line package 32 therein from which line L is adapted to be paid out in the conduit C as the line carrier 30 moves through the conduit C under the influence of fluid pressure. It will be understood that the diameter of the line package 32 exceeds the diameter of the bore 31 sufficiently to cause the line package 32 to be snugly, but releasably, retained therein when the diameter of the bore 31 is expanded as the line package 32 is inserted therein. The line package 32 comprises a casing or wrapping 33 of suitable pliable material, such as paper or plastic, the casing 33 having an elongated substantially cylindrical shape, and a supply of pliable line L snugly received within the casing 33. The supply of line L is wound in an elongated substantially cylindrical roll 34, being preferably wound so that the line L will be unwound from its center outwardly as it is paid out in the conduit C in response to the forward movement of the line carrier 30 under the influence of fluid pressure. It is contemplated that the casing 33 may be applied about the elongated roll 34 of line L as a thin coating to adhere the outer windings of the line L together for maintaining the cylindrical shape of the roll 34 of line L. It should be understood, however, that the line package 32 could consist of the cylindrical roll 34 of line alone which could be directly inserted within the bore 31 provided in the line carrier 30.

A third form of line carrier according to the present invention is illustrated in FIGURES 8-10, inclusive, wherein the line carrier is designated by reference numeral 40. In a manner similar to the line carrier 30, the line carrier 40 is adapted to carry an elongated substantially cylindrical line package 32. The line carrier 40 comprises an elongated strip of highly compressible, elastomeric synthetic foam material, such as polyurethane, which is coiled about the line package 32 so as to form an elongated cylindrical plug having a plurality of plies 41 of the strip material. The strip material preferably includes an adhesive coating 42 on one side thereof to bind the adjacent plies 41 of the line carrier 40 together and to secure the line package 32 in the line carrier 40. After coiling the strip material about the line package 32 to form a line carrier 40 having a desired diameter, the line carrier 40 may then be inserted within one end of the conduit C through which it is to be passed, whereupon line L will be paid out from the cylindrical roll 34 of line L of the line package 32 as the line carrier 40 proceeds forwardly within the conduit C under the influence of fluid pressure. Following its assembly, it will be apparent that the line carrier 40 operates thereafter in the manner of the line carrier 30 illustrated in FIGURES 5-7, inclusive, to lay the guide line L in the length of the conduit C. The line can 14 illustrated as part of the apparatus including the line carrier 10 of FIGURES 2-4, inclusive, is not required with the line carriers 30 and 40 of FIGURES 5-7, inclusive, and FIGURES 8-10, inclusive, respectively, since a line package 32 providing a supply of line L is mounted in each of the line carriers 30 and 40.

It will be understood that the line carriers 30 and 40, as in the case of the line carrier 10, can be employed in conduits having a wide range of internal diameters—the dimensional relationships of the diameters of the line carriers 30 and 40 with respect to the range of internal conduit diameters for which they are suitable being the same as that exemplified by the examples previously enumerated in connection with the line carrier 10. Compression of the line carriers 30 and 40 upon their insertion within a conduit produces the peripheral, annular, rearwardly flaring tail 24 and the concave depression 25 in the trailing ends thereof, as described in connection with the line carrier 10. The line carriers 30 and 40 also exhibit an outer peripheral surface defining an elongated cylindriform sealing area 26 for sealing engagement with the internal wall surface of a conduit in which they may be respectively disposed.

Essentially, the line carriers 30 and 40 may be said to differ from the line carrier 10 in that the line carriers 30 and 40 transport their own supply of line which is paid out in the length of the conduit as the line carriers 30 and 40 move therethrough, while the line carrier 10 lays line in the length of the conduit by pulling the line from a line supply disposed outside of the conduit. While the line carriers have been described herein as being substantially cylindrical in shape for employment within cylindrical conduits, it should be understood that line carriers having various cross-sectional shapes, such as rectangular, triangular, etc., may be employed for the purpose described with conduits having passages with transverse cross-sections complementary thereto.

It will therefore be seen that I have disclosed an improved method and apparatus for laying a guide line in the length of a conduit by relying upon the force of fluid pressure directed against the trailing end of a line carrier. The line carrier, which is embodied in a plurality of forms, is made of a highly compressible, elastomeric synthetic foam material having a diameter in its initial uncompressed state greater than the internal diameter of the conduit through which it is to be passed. An effective fluid-tight seal with the internal wall surface of the conduit is provided along the entire outer peripheral surface of the line carrier which defines an elongated cylindriform sealing area without a material increase in the frictional resistance encountered by the line carrier as it is thrust through the conduit by the force of fluid pressure applied thereagainst. Whatever frictional resistance may be present can be further reduced by providing the highly compressible, elastomeric synthetic foam material of the line carrier with a thin impervious skin about its outer exposed surface adapted to engage the internal wall surface of the conduit.

In the drawings and specification there have been set forth preferred embodiments of the invention and, although specific terms are employed, they are used in a generic and descriptive sense only and not for purposes of limitation, the scope of the invention being defined in the claims.

I claim:
1. An apparatus for laying a line in a conduit wherein a supply of line is disposed outwardly of the conduit with one end of the line extending into the conduit and means for creating a pressure differential within the conduit, the combination of:
   (a) a line carrier formed of compressible material and having a normal cross-sectional area greater than the internal cross-sectional area of the conduit for traversing the conduit in sealing engagement with the walls of the conduit, and
   (b) a pin carried by the line carrier and adapted for substantial axial alignment with the conduit when the carrier is compressed within the conduit, and
      (i) said pin having a body portion and a head comprising an extension of the body portion and of the same cross-sectional area as the body portion, the head extending in angular relation to the body portion in engagement with the line carrier, and
      (ii) means on the end of the body portion remote from the head for connecting the pin to said one end of the line.
2. A structure according to claim 1 wherein the pin is approximately the same cross-sectional area as the line.
3. A structure according to claim 1 wherein the body portion and the angularly extending head occupy a common plane.

References Cited by the Examiner
UNITED STATES PATENTS

| | | | |
|---|---|---|---|
| 252,956 | 1/82 | Loane | 254—134.4 |
| 297,929 | 4/84 | Goebel | 254—134.4 |
| 979,899 | 12/10 | Steigleder | 254—134.4 |
| 2,729,424 | 1/56 | Eppensteiner. | |
| 2,794,197 | 6/57 | Crane. | |
| 2,906,650 | 9/59 | Wheaton | 15—104.06 X |
| 3,011,197 | 12/61 | Nehse et al. | 15—104.06 |
| 3,091,433 | 5/63 | Riley | 254—134.4 |

FOREIGN PATENTS
18,561  10/91  Great Britain.

WILLIAM FELDMAN, Primary Examiner.

HARRISON R. MOSELEY, MILTON S. MEHR, Examiners.